United States Patent
Martin et al.

(10) Patent No.: US 12,204,348 B1
(45) Date of Patent: Jan. 21, 2025

(54) SYSTEM FOR EVOLVING CONTROLLERS FOR MICRO-AIR VEHICLES

(71) Applicant: HRL Laboratories, LLC, Malibu, CA (US)

(72) Inventors: Charles E. Martin, Santa Monica, CA (US); Heiko Hoffmann, Simi Valley, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 266 days.

(21) Appl. No.: 17/885,246

(22) Filed: Aug. 10, 2022

Related U.S. Application Data

(60) Provisional application No. 63/235,615, filed on Aug. 20, 2021.

(51) Int. Cl.
*G05D 1/00* (2024.01)
*B64C 39/02* (2023.01)

(52) U.S. Cl.
CPC .......... *G05D 1/106* (2019.05); *B64C 39/024* (2013.01); *B64C 39/028* (2013.01); *B64U 2201/20* (2023.01)

(58) Field of Classification Search
CPC .... G05D 1/106; B64C 39/024; B64C 39/028; B64U 2201/20; B64U 10/80
See application file for complete search history.

(56) References Cited

U.S. PATENT DOCUMENTS

| | | | | |
|---|---|---|---|---|
| 11,455,336 B2 * | 9/2022 | Skarica | ................ | G08G 5/003 |
| 2016/0313742 A1 * | 10/2016 | Wang | ................ | G05D 1/0676 |
| 2016/0330601 A1 * | 11/2016 | Srivastava | ............ | B64C 39/024 |
| 2017/0023937 A1 * | 1/2017 | Loianno | ................ | G08G 5/0069 |
| 2017/0148328 A1 * | 5/2017 | Chan | .................... | G08G 5/0069 |
| 2017/0233097 A1 * | 8/2017 | Chang | ................. | G08G 5/0069 |
| | | | | 701/3 |
| 2019/0334741 A1 * | 10/2019 | Dormiani | ............. | B64C 13/505 |
| 2020/0223543 A1 * | 7/2020 | Singh | ................ | H04B 7/18506 |
| 2020/0233411 A1 * | 7/2020 | Ivanov | .................... | G01W 1/08 |
| 2020/0324892 A1 * | 10/2020 | Benedict | ................ | F16H 21/40 |
| 2020/0331607 A1 * | 10/2020 | Yamada | ................... | B64F 5/60 |

(Continued)

OTHER PUBLICATIONS

J. Kennedy. Stereotyping: Improving particle swarm performance with cluster analysis. In The 2000 Congress on Evolutionary Computation, 2000, pp. 1507-1512.

(Continued)

*Primary Examiner* — Abdalla A Khaled
(74) *Attorney, Agent, or Firm* — TOPE-MCKAY & ASSOCIATES

(57) ABSTRACT

Described is a system for optimizing controllers for micro-air vehicles. The system identifies binary rules that lead to a desired behavior of a micro-air vehicle. The binary rules are identified by sampling rule-sets from a probability distribution over a search space. A fitness value of each rule-set for the desired behavior is determined, and top-performing rule-sets are selected. The top-performing rule-sets are used to update the probability distribution over the search space until a convergence criterion is met, resulting in a fittest rule-set. A control signal based on the identified binary rules is transmitted to one or more actuators of the micro-air vehicle.

17 Claims, 5 Drawing Sheets

(56) References Cited

U.S. PATENT DOCUMENTS

2021/0300553 A1* 9/2021 Exner .................... G05D 1/667
2023/0245444 A1* 8/2023 Brockers ................ G06V 20/17
                                                        348/144

OTHER PUBLICATIONS

Gao X. Zhang, M., and W. Lou. A new crossover operator in genetic programming for object classification. In IEEE Transactions on Systems, Man, and Cybernetics, Part B (Cybernetics), pp. 1332-1343, 2007.

J. Liang and P. Suganthan. Adaptive comprehensive learning particle swarm optimizer with history learning. In International Conference on Simulated Evolution and Learning, pp. 213-220, 2006.

M. Clerc M. Salman A., Omran and S. Alsharhan. Improving the performance of comprehensive learning particle swarm optimizer. Journal of Intelligent & Fuzzy Systems, 30: pp. 735-746, 2016.

Martin Krejca and Carsten Witt. Theory of Estimation-of-Distribution Algorithms. Proceedings of the Genetic and Evolutionary Computation Conference Companion, pp. 1170-1197, 2018.

\* cited by examiner

SYSTEM FOR EVOLVING CONTROLLERS FOR MICRO-AIR VEHICLES

CROSS-REFERENCE TO RELATED APPLICATIONS

This is a Non-Provisional Application of U.S. Provisional Application No. 63/235,615, filed in the United States on Aug. 20, 2021, entitled, "System for Evolving Controllers for Micro-Air Vehicles," the entirety of which is incorporated herein by reference.

BACKGROUND OF INVENTION

(1) Field of Invention

The present invention relates to a system for evolving controllers for micro-air vehicles and, more specifically, to a system for evolving controllers for micro-air vehicles using a unique evolutionary search algorithm.

(2) Description of Related Art

Due to their small size, micro-air vehicles (MAV) require small controllers that consume little power, yet are flexible enough to represent the needed mapping between the vehicle's sensor inputs and control signals for its actuators. The technical challenge of the mapping is an optimization problem that can involve hundreds of thousands, or even millions, of dimensions to search over, which introduces a scalability issue.

The most popular approach to solving an optimization problem is genetic algorithms (GA) and other forms of evolutionary computation, such as genetic programming. For example, in Literature Reference No. 1 of the List of Incorporated Literature References, cluster analysis is applied to historical fitness function samples from individual solutions to update their best positions in the search space. Another direction is to use methods that leverage machine learning to identify good "building blocks" within a population and use specially designed crossover operators to preserve them (see Literature Reference No. 2).

Estimation of Distribution Algorithms (EDA) draws populations of solutions from an evolving probability distribution and iteratively updates this distribution based on the best performing solutions (e.g., Literature Reference No. 5). Particle Swarm Optimization (PSO) is another type of optimization method. PSO is well-known for its ability to effectively combine local and global search. In the "Comprehensive Learning Particle Swarm Optimizer" algorithm (see Literature Reference Nos. 3 and 4), a learning process is used to identify patterns in historical samples of the fitness function that help guide particles towards promising regions of the search space.

The majority of combinatorial optimization methods do not scale to a very large search space. Additionally, search methods based on stochastic gradient descent require a continuous-valued search space. Thus, a continuing need exists for controllers that require far fewer parameters than existing methods, but can still perform at a comparable level.

SUMMARY OF INVENTION

The present invention relates to a system for evolving controllers for micro-air vehicles and, more specifically, to a system for evolving controllers for micro-air vehicles using a unique evolutionary search algorithm. The system comprises one or more processors and a non-transitory computer-readable medium having executable instructions encoded thereon such that when executed, the one or more processors perform multiple operations. The system identifies a set of binary rules that leads to a desired behavior of the micro-air vehicle. Identifying the set of binary rules comprises (a) sampling a plurality of rule-sets from a probability distribution over a search space; (b) determining a fitness value of each rule-set for the desired behavior; (c) selecting a set of top-performing rule-sets having fitness values at or above a predetermined percentile; (d) using the set of top-performing rule-sets, updating the probability distribution over the search space; and repeating (a) through (d) until a convergence criterion is met, resulting in a fittest rule-set. A control signal based on the identified set of binary rules is transmitted to one or more actuators of the micro-air vehicle.

In another aspect, the desired behavior is at least one of landing safely on ground and avoiding obstacles during flight.

In another aspect, the system stores a binary-value from each sensor input in a cell of a register having a plurality of rows; sums the binary-values within each row of each register, wherein for each register, a maximum value among the sums of its rows becomes the register's output; identifies a largest of the maximum values; and determines the control signal using the largest of the maximum values.

In another aspect, the rule-sets are sparse binary vectors that act as templates for patterns in the input, and the system determines a quality of a match between the input and a rule-set by performing an element-wise exclusive-or operation between the input and the rule-set and summing the result.

In another aspect, for each rule in a rule-set, a list of positive numbers with a length corresponding to a number of sensor inputs is defined, resulting in a set of lists, and wherein the set of lists is used to define a probabilistic generative model with the probability distribution.

In another aspect, updating the probability distribution over the search space comprises updating the plurality of rule-sets sampled based on the fittest rule-set.

In another aspect, multiple updated rule-sets are combined and a fittest rule-set is identified from the combination of updated rule-sets.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
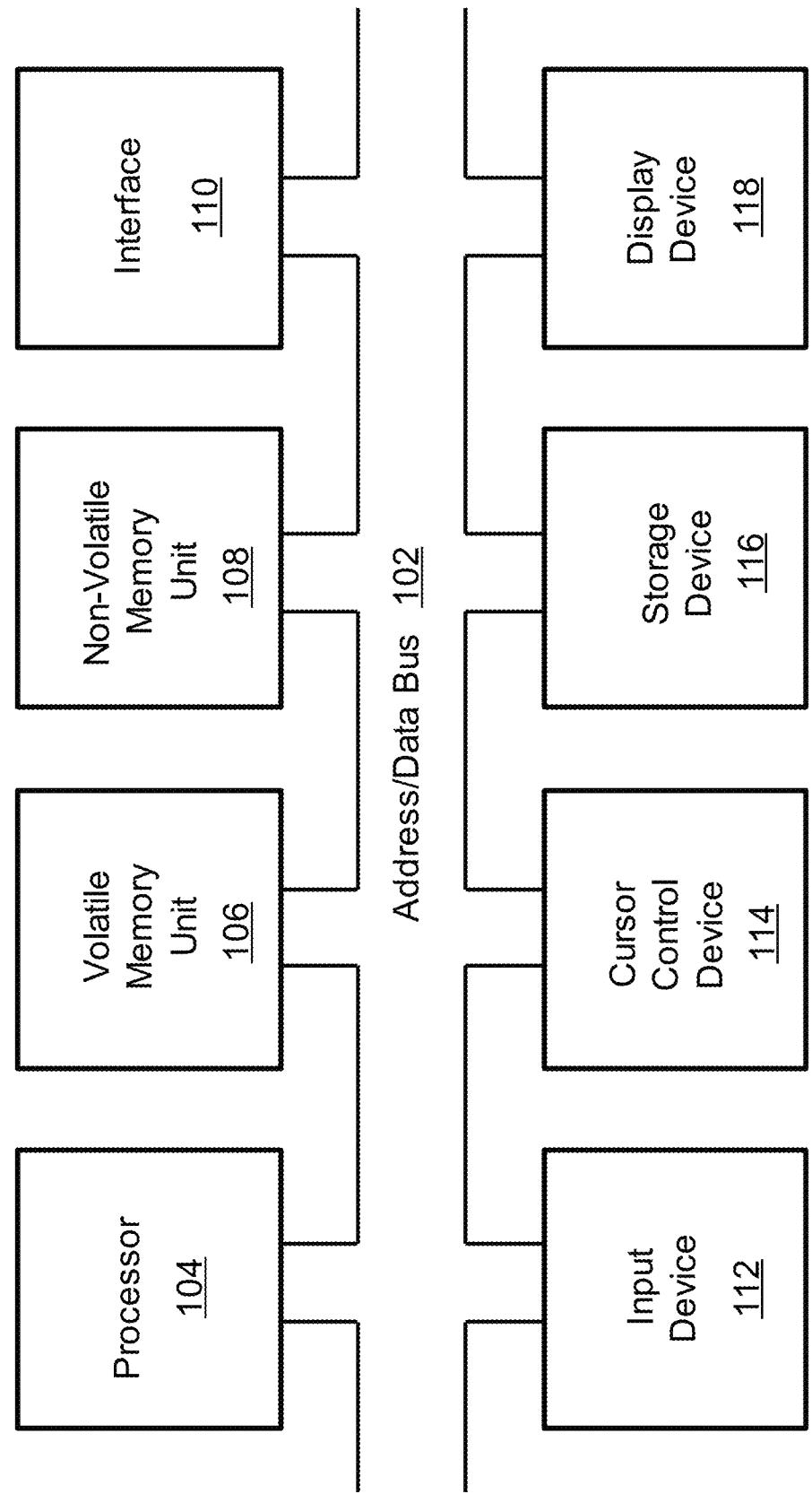
FIG. 1 is a block diagram depicting the components of a system for evolving controllers for micro-air vehicles according to some embodiments of the present disclosure.

The present invention relates to a system for evolving controllers for micro-air vehicles and, more specifically, to a system for evolving controllers for micro-air vehicles using a unique evolutionary search algorithm. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction is provided to give an overview of the present invention. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. J. Kennedy. Stereotyping: Improving particle swarm performance with cluster analysis. In The 2000 Congress on Evolutionary Computation, 2000.
2. Gao X. Zhang, M., and W. Lou. A new crossover operator in genetic programming for object classification. In IEEE Transactions on Systems, Man, and Cybernetics, Part B (Cybernetics), pages 1332-1343, 2007.
3. J. Liang and P. Suganthan. Adaptive comprehensive learning particle swarm optimizer with history learning. In International Conference on Simulated Evolution and Learning, pages 213-220, 2006.
4. M. Clerc M. Salman A., Omran and S. Alsharhan. Improving the performance of comprehensive learning particle swarm optimizer. Journal of Intelligent & Fuzzy Systems, 30:735-746, 2016.
5. Martin Krejca and Carsten Witt. Theory of Estimation-of-Distribution Algorithms. Proceedings of the Genetic and Evolutionary Computation Conference Companion, pp. 1170-1197, 2018.

(2) Principal Aspects

Various embodiments of the invention include three "principal" aspects. The first is a system for evolving controllers for micro-air vehicles. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
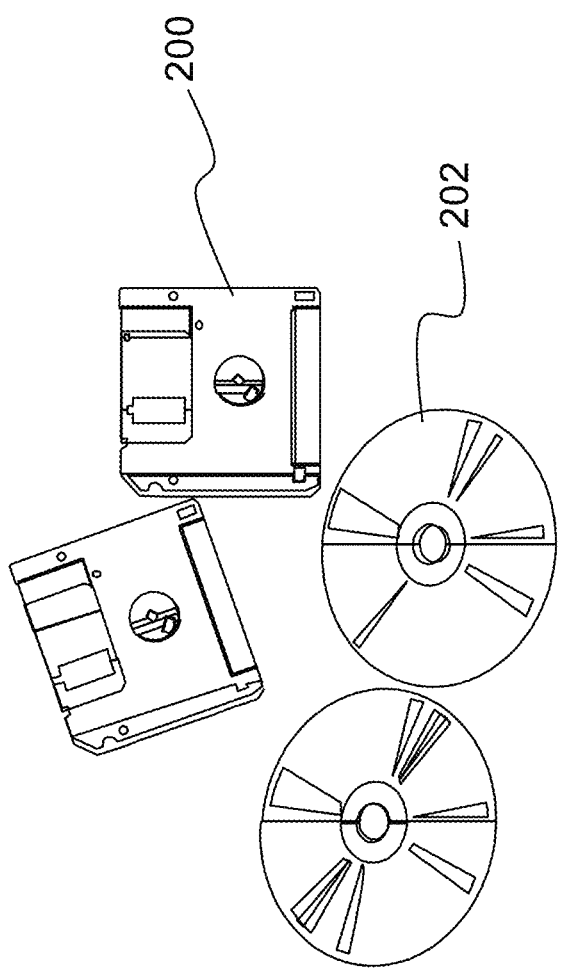
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system and method for optimizing logic of one or more controllers of low-SWaP (size, weight, and power) micro-air vehicles with a unique evolutionary search algorithm. Due to their small size, micro-air vehicles (MAV) require small controllers that consume little power, yet are flexible enough to represent the needed mapping between the vehicle's sensor inputs and control signals for its actuators. The most popular approach to solving an optimization problem is genetic algorithms (GA) and other forms of evolutionary computation, such as genetic programming. Initially, GA was used to evolve controllers for micro-air vehicles. Various techniques were tried to get the GA to scale to the needed high-dimensional search spaces, but were ultimately unsuccessful. However, it was found that these and similar approaches were not able to scale to tens of thousands to hundreds of thousands of dimensions, which was a requirement. This led to the creation of the scalable invention described in this disclosure.

Estimation of Distribution Algorithms (EDA) (e.g., Literature Reference No. 5) was tried, but it was found that the convergence was too slow and the quality of controllers was unacceptably low as the dimensionality of the search spaces reached into the tens of thousands and beyond. A couple of different variants and enhancements of Particle Swarm Optimization (PSO) for handling high-dimensional discrete spaces were attempted, specifically the approach described in Literature Reference Nos. 3 and 4. However, it was found to be ineffective at finding good controllers in the high-dimensional, discrete spaces that was used for testing.

Creation of the invention described herein required extensive attempts of state-of-the-art approaches that failed and then creating and combining unique methods that ultimately led to a successful invention. After the Genetic Algorithm and PSO approaches that were tested failed to produce good controllers, it was decided to formulate the problem as sampling potential solutions (controllers) from an evolving probability distribution. Some well-known EDA approaches were tried. These approaches proved insufficient due to slow convergence and poor performing controllers, which led to the first two innovations described in sections (4.3) and (4.4) below. However, this was not sufficient because while the evolutionary search process would now converge in a reasonable amount of time, the controllers were not of adequate quality for controlling the micro-air vehicles described in section (4.7). This led to the next innovation to improve the local search capabilities of the invention, which is described in section (4.5). This resulted in sometimes finding controllers with good performance, but it was not consistent. This led to the final innovation, which improved the global search capabilities of the invention so that it would consistently find good performing controllers for micro-air vehicle tests. This last innovation is described in section (4.6).

(4) Specific Details of Various Embodiments of the Invention

The present invention is a controller architecture that optimizes logic of controllers, which is represented by a set of rules that are used to determine how inputs from a micro-air vehicle's sensors are mapped to control signals for its actuators. A sensor input to the controller may be a temporal sequence of sparse (mostly zeros) binary vectors, which are concatenated end-to-end to form a single binary vector. The rules are also sparse binary vectors and act as templates for patterns in the input. This makes it easy to determine the quality of a match between a sensor input and a rule by performing an element-wise exclusive-or (XOR) operation between them and summing the result. The control signals are then determined by identifying the best matching set of rules, which involves identifying the largest integers in a list. Importantly, both of these operations can be performed relatively easily by small, low-power electronic/digital circuits, such as those found in micro-controllers. A unique aspect of the invention comes from the need to search for and identify a set of binary rules that leads to desired behaviors of the micro-air vehicle, such as the ability to not crash into objects (i.e., avoid obstacles) while flying and to land safely. This can be formulated as a combinatorial optimization problem. The technical challenge that the invention described herein addresses is that this optimization problem can involve hundreds of thousands, or even millions, of dimensions to search over.

The present invention has three key innovations that address this scalability issue: (1) a mechanism for incorporating prior knowledge into the evolutionary search process; (2) a mechanism for accelerating the convergence to good solutions; and (3) a mechanism for adapting the search process using a combination of local and global information. Using these innovations, multiple benefits are achieved.

First, the system described herein scales to optimizing controllers even when the search process involves hundreds of thousands, or millions, of dimensions. The logic of the controller, which is represented by a set of rules, is optimized. In a real-world setting, the controller may be a physical device, such as an Arduino micro-controller or a specially designed digital circuit, that implements the rules using digital logic. For example, a relatively simple controller with five sensor inputs and five control signal outputs, where each input and output has one hundred possible values, can easily involve a one-million-dimensional search space. The majority of existing combinatorial optimization methods do not scale to search spaces this large. Secondly, unlike search methods based on stochastic gradient descent, the present invention does not require a continuous-valued search space. This is clear from the binary nature of the controllers. By moving away from controllers that require continuous valued variables and parameters, such as deep neural networks, the controllers of the present invention require less power and can be fit into a smaller form factor. In addition, because the controllers use only sparse binary representations for information processing, they require far fewer parameters than deep neural networks, but can still perform at a comparable level.

(4.1) Controller Architecture

Figure 3:
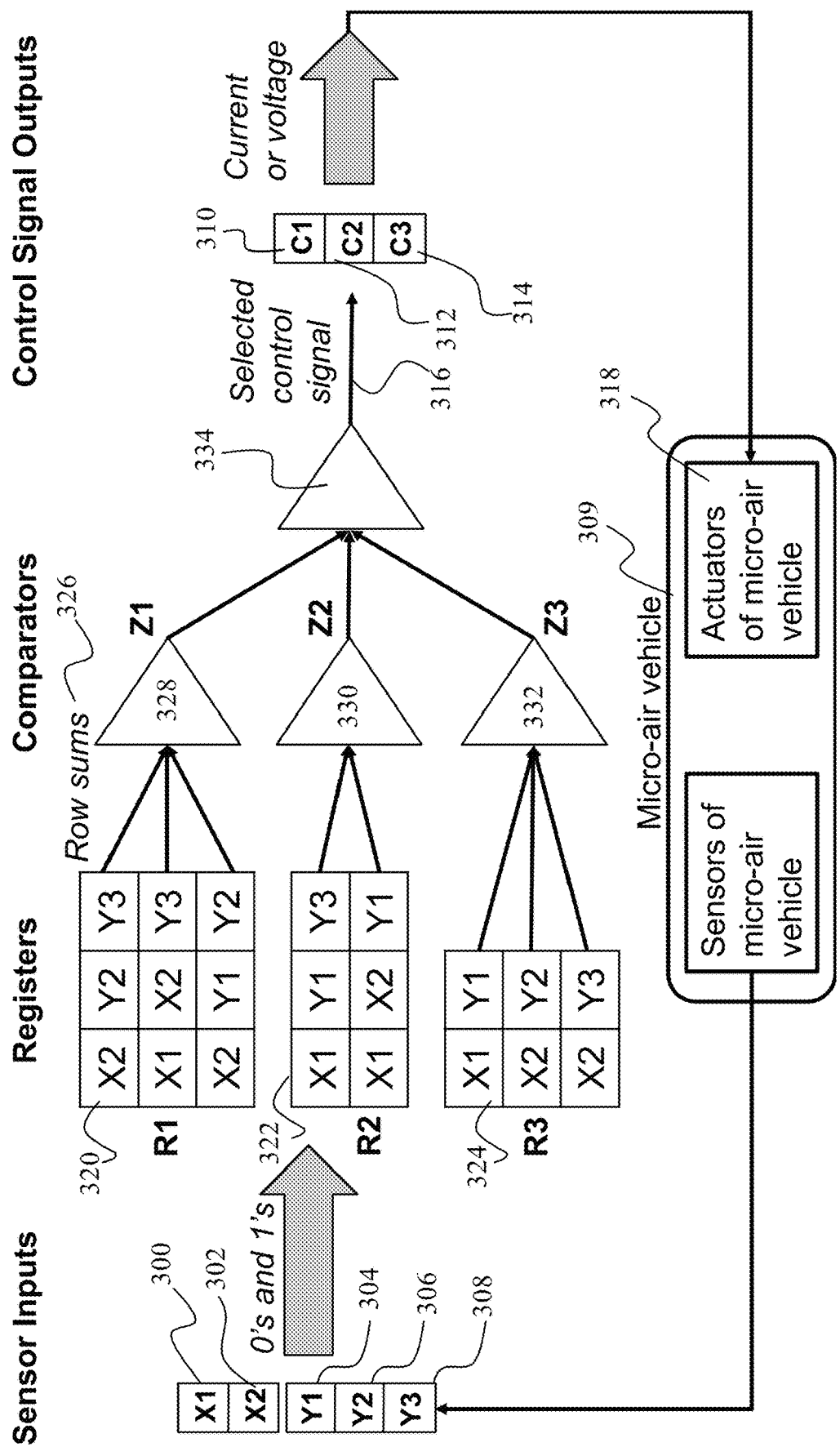
FIG. 3 is an illustration of a low-SWaP (size, weight, and power) micro-air vehicle controller architecture with register values (connections) to be optimized according to some embodiments of the present disclosure.

The invention described herein optimizes low-power controllers; therefore, the types of operations that the controller uses is restricted. Controllers that have binary-valued inputs and internal states and a fixed number of outputs each associated with a fixed numeric value are considered. A non-limiting example controller architecture is shown in FIG. 3. This controller has a total of 5 binary-valued inputs 300, 302, 304, 306, and 308. Sensor inputs X1 300 and X2 302 are associated with a measurable quantity X, such as whether or not the MAV 309 is currently flying. For example, X1=1 and X2=0 indicates the MAV 309 is on the ground, whereas X1=0 and X2=1 indicates the MAV 309 is in the air. Inputs Y1 304, Y2 306, and Y3 308 are associated with a measurable quantity Y, such as the vertical speed of the MAV 309. For example, Y1=1 if and only if the vertical speed is >1 meter (m)/second(s), Y3=1 if and only if the vertical speed is ≤1 m/s, otherwise Y2=1. There are three control outputs labelled C1 310, C2 312, and C3 314. These are associated with a control signal 316 sent to the MAV's actuators 318, for example, an electric current that controls the rate of rotation of a propeller. For example, the control signals 316 transmitted could be C1=0 milliamperes (mA), C2=1 mA, and C3=2 mA. Each control output (C1-C3 310, 312, and 314) is associated with a register of binary-valued variables, which are labeled R1-R3 320, 322, and 324 in FIG. 3. The registers 320, 322, and 324 need not be the same size and the rows can have different numbers of columns within a register. The alpha-numeric characters within the cells of the registers indicate connections between the inputs and the cells. These connections are optimized by the invention described herein. For example, cell (1,1) in register R1 is labelled with X2, which means that this cell reads and stores the binary-value from input X2. The sensory input portion of the controller may include a memory buffer of past inputs that act as additional inputs to the registers.

When an input is received by the controller, each cell reads and stores the value of its single input (either 0 or 1). Next, the values within each row of each register are summed (i.e., row sums 326). For each register, the maximum value among the sums of its rows becomes the register's output, which is denoted in FIG. 3 by Z1 328, Z2 330, and Z3 332. There is a one-to-one mapping between the Z's and the C's (e.g., Z1→C1, Z2→C2, and Z3→C3). Next, a comparator 334 identifies the largest of these values and selects the corresponding output for the controller. A tie can be broken by choosing randomly. For example, if Z3 332 is selected, then the controller output is C3=2 mA. Note that the controller only needs to process binary and integer valued data, and uses summation and comparison, but no multiplication or division, thus saving on size, weight, and power.

(4.2) Evolutionary Search Algorithm

Figure 4:
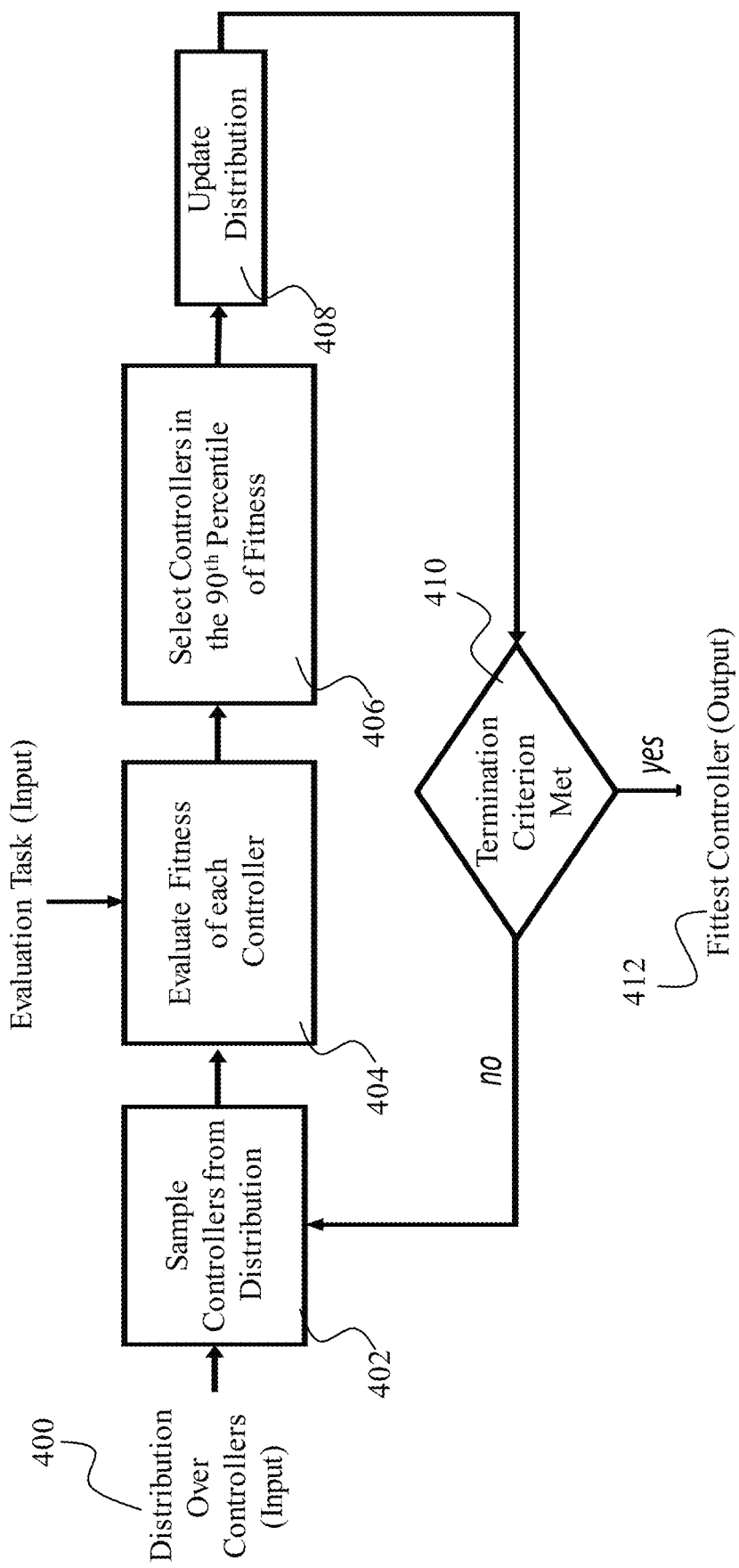
FIG. 4 is an illustration of a high-level overview of the approach for evolving controllers for micro-air vehicles according to some embodiments of the present disclosure.

This section describes the unique evolutionary search algorithm that optimizes the connections of low-SWAP MAV controllers, as described above. The following is a summary of the approach according to embodiments of the present disclosure and a description of components in subsequent sections. As illustrated in the flow diagram of FIG. 4, the input to the invention is a probability distribution 400 over a search space of controllers. The controllers are configured to send signals to one or more actuators, such as an engine that provides thrust for the vehicle. A signal may indicate that thrust is to be generated or not. A signal may also indicate the strength of the target thrust, for example, measured in Newtons. If there is no available prior information about where high-performing controllers live in this space, then the distribution should be uniform. Otherwise, greater density/mass of the input distribution can be placed in regions of the search space where high-performing controllers are expected to live.

The first step is to sample controllers from the current distribution (i.e., sample controllers from distribution 402). In the next step, the performance (fitness) of each controller is evaluated on a pre-defined task (i.e., evaluate fitness of each controller 404). For example, this task may be controlling a micro air-vehicle to land safely on the ground. Next, the top predetermined (e.g., $90^{th}$) percentile of controllers with respect to fitness (or performance) is determined. The percentile can be adjusted by the user; however, it was found the $90^{th}$ percentile works well across a range of different applications. Controllers in the $90^{th}$ percentile of fitness are selected 406. In the next step, these top-performing controllers are used to update the probability distribution over the space of controllers (i.e., update distribution 408), so that future samples from the distribution are more likely to produce controllers that exhibit good performance on the evaluation task. Details are provided in section (4.4) below. Lastly, the evolutionary search process is checked for convergence (i.e., termination criterion met 410), which is the point when sampling the distribution will always return the same controller. If the process has converged, the output of the invention described herein is the identification of the fittest (best performing) controller 412. If the process has not converged, a new batch of controllers is sampled from the distribution for evaluation (i.e., sample controllers from distribution 402).

(4.3) Representation of the Search Space

In what follows, a single row of a register including its entries (see section (4.1)) is referred to as a "rule". For example, the controller shown in FIG. 3 has eight rules spread across three registers. The approach according to embodiments of the present disclosure evolves a probability distribution P over the space of all possible rules. Denote the number of sensor inputs that the controller has by $N_c$, and for each rule, define a list of positive numbers, L, that has length $N_c$. Denote the set of all such lists by SL. This set is used to define a probabilistic generative model with probability distribution P over the space of rules, and thus controllers. Specifically, to sample the M input connections for a given rule (e.g., the entries in the first row of register R1 320), normalize L so that it represents a probability distribution over the integers in the interval [1, $N_c$], and then sample a list of M integers without replacement from this distribution. The rule is instantiated with connections by mapping the integers in [1, $N_c$] to the sensor inputs. For example, in FIG. 3, there is 1→X1, 2→X2, 3→Y1, 4→Y2, and 5→Y3. Thus, if the list of sampled integers was [2, 4, 5], then the connections for the rule would be [X2, Y2, Y3]. To sample a single complete controller (i.e., all rules instantiated with connections), the aforementioned stochastic process is repeated for each list in $S_L$).

(4.4) Updating the Rule Lists

The set of rule lists $S_L$ coupled with the aforementioned stochastic process applied to each list in $S_L$ represents a probability distribution over the space of rule-sets (controllers). The approach described herein adapts this probability distribution so that it becomes increasingly likely to sample high-performing controllers as the evolutionary process proceeds. Assume that one would like to update the distribution so that it becomes more likely to select the rule [X2, Y2, Y3] for the first row of register R1. Selecting these connections corresponds to selecting the integers [2, 4, 5]. Therefore, given the list L that corresponds to the first row of register R1, its entries at positions 2, 4, and 5 are increased as L[2]←c*L[2], L[4]←c*L[4], and L[5]←c*L[5], where c>1. It was found that c=1.1 works well across a range of applications and configurations. This process puts more of the "mass" of the probability distribution on these particular positions (integers) of the list L, thus making them more likely to be sampled in the future.

The coupling of the aforementioned process for updating the probability distribution with an evolutionary process is one of the unique aspects of the approach described herein. Initially, the standard approach of adding a fixed positive value to the entries in the lists (i.e., L[2]←c+L[2]) was tried. However, it was found that this approach leads to unacceptably slow convergence rates. In contrast, the multiplicative approach according to embodiments of the present disclosure accelerated convergence to high-performing solutions by >10×.

(4.5) Local Search Process

The evolutionary search algorithm described herein keeps track of the best controller found so far. Specifically, this means recording the entries of the registers of the highest-performing controller. This information is used to update the probability distribution P over the space of all possible rules so that it places a large amount of probability "mass" on the specific rule set implemented by the best controller. Recall that a rule refers to a single row of a register with associated entries. This is achieved as follows.

For illustration, assume that a new, best controller (or rule-set) has been discovered and that its rule corresponding to the first row of register R1 is [X1, X2, Y1]. The approach of the present invention updates the corresponding rule list L as L[1]=$k_{high}$, L[2]=$k_{high}$, L[3]=$k_{high}$, L[4]=$k_{low}$, L[5]=$k_{low}$, where $k_{high}$=p/M, $k_{low}$=(1−$p_{max}$)/(|L|−M), 0<$p_{max}$<1, M is the number of input connections for a given rule (i.e., M=3), and |L| is the length of the rule list (i.e., total number of sensor inputs). Recall that the following mapping between rule list indexes and sensor inputs has been defined: 1→X1, 2→X2, 3→Y1, 4→Y2, and 5→Y3). This updating process is repeated for each rule list.

Intuitively, $p_{max}$ is the total amount of probability "mass" distributed across the input connections that appear in the corresponding rule (X1, X2, and Y1 in the example). Larger values of $p_{max}$ make it more likely that controllers that are subsequently sampled from the distribution P are similar to the current best performing controller. There is an inherent trade-off between making $p_{max}$ large, and, thus, exploiting the useful connectivity patterns in the current best controller, versus making $p_{max}$ smaller, and thus enabling more exploration. It was found that a value of $p_{max}=0.8$ works well in experiments. This tunable local search process combined with the co-evolution of the individual rules for scalability is part of the uniqueness of the invention.

(4.6) Global Search Process

The evolutionary search algorithm according to embodiments of the present disclosure allows multiple evolutionary processes to occur simultaneously and to share information with one another about rules that make good controllers. Each evolutionary process has its own probability distribution P over the space of rules. Without loss of generality, assume that there are three evolutionary processes each with their own distribution $P_1$, $P_2$, and $P_3$. Let $L_{1,1}$ be the list of positive numbers for the first row of the first register for process 1, $L_{1,2}$ be the list of positive numbers for the first row of the first register for process 2, and $L_{1,3}$ be the list of positive numbers for the first row of the first register for process 3. See section (4.3) for more details. During each epoch of evolution, process 1 can decide to use either $L_{1,1}$, $L_{1,2}$, or $L_{1,3}$ when sampling its corresponding rule. First, if the highest performing controller found by process 2 is greater than that for process 3, then process 1 will not use $L_{1,3}$, and vice versa. Next, an unbiased coin is flipped to decide if process 1 will use $L_{1,1}$ or the better of $L_{1,2}$ and $L_{1,3}$. This procedure is applied to each rule of each process. The procedure generalizes to greater than three evolutionary processes by having each process have exactly two neighbors. That is, the neighbors are connected in a ring topology. This global search process is part of the uniqueness of the present invention and works together with the local search process to quickly identify good regions within the space of rule-sets and quickly exploit them. It is a straight-forward and effective means of combining the probability distributions of multiple evolutionary processes to improve coverage of the search space.

(4.7) Control of a Simulated Micro-Air Vehicle

Figure 5:
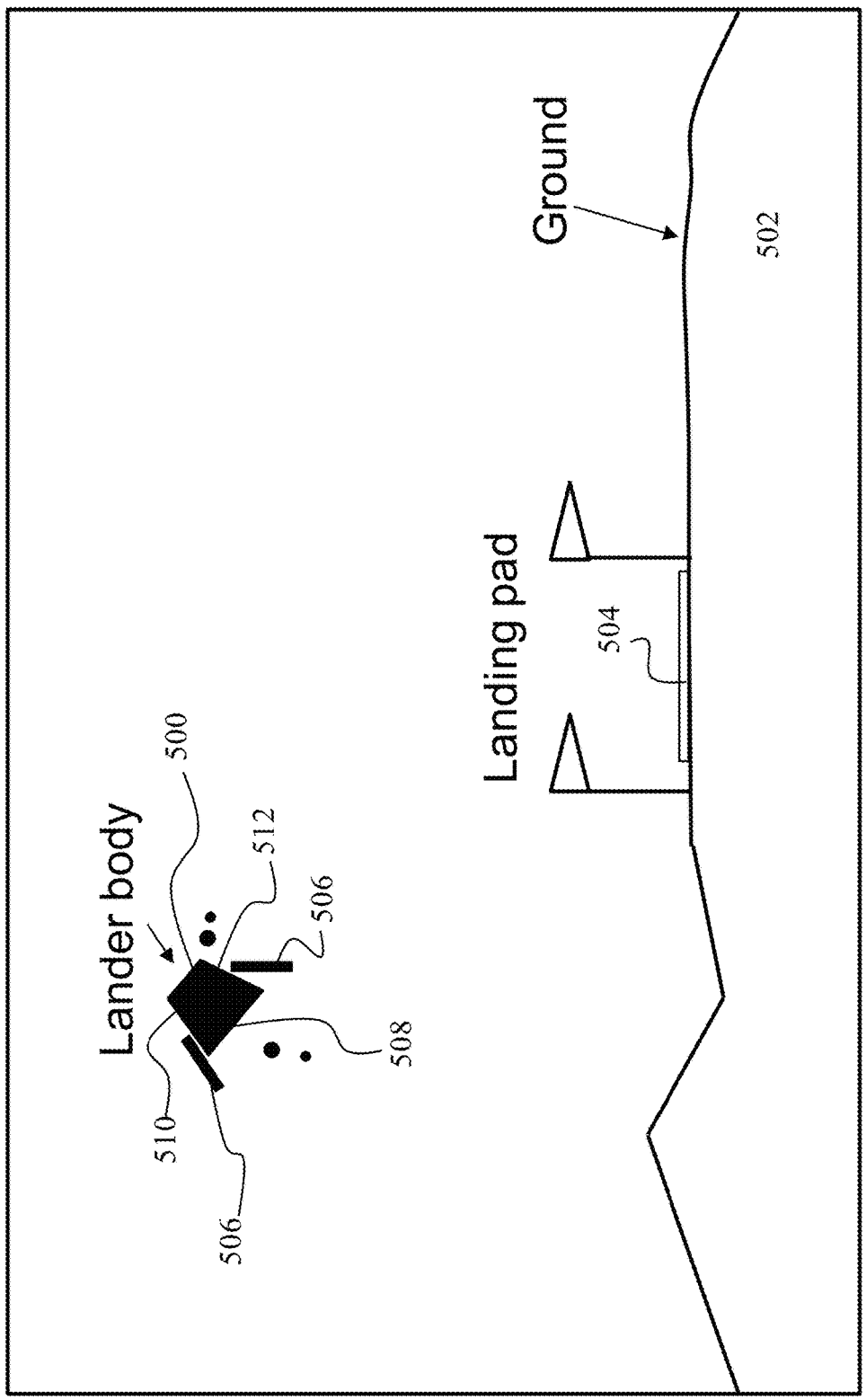
FIG. 5 is an illustration of a simulation run where a lunar lander is being controlled by a controller according to some embodiments of the present disclosure.

Described in this section is the application of the invention to evolving low-SWaP controllers for micro-air vehicles. A well-known simulated environment was utilized to test the invention. The standard set-up of the benchmark Lunar Lander challenge was adhered to in the experiments. In this set-up the goal is to control the descent of a space vehicle (i.e., lander 500) so that it lands safely on the surface (i.e., ground 502) of a planet, as depicted in FIG. 5. The lander 500 starts from the top of the screen (with random initial velocity) and the landing pad 504 is always at coordinates (0,0). The standard scoring/fitness function was used for this task. Each simulation episode finishes if the lander 500 crashes or comes to rest, receiving additional −100 or +100 points, respectively. Each contact between a leg 506 and the ground is +10. Firing the main engine 508 is −0.3 points each frame. Firing a side engine (left engine 510, right engine 512) is −0.03 points each frame. The task is considered solved when at least 200 points is achieved. There is an 8-dimensional continuous state space and a 2-dimensional continuous action space. The state space consists of horizontal and vertical position, horizontal and vertical velocity, angle, and angular velocity, and left and right leg contact. For each observed state, the controller selects from four possible actions: do_nothing, fire_left_engine, fire_right_engine, and fire_main_engine. This is implemented using two control/action output variables that that range between −1 and 1.

The evolutionary search algorithm according to embodiments of the present disclosure was used to optimize a controller of the form shown in FIG. 3. The input to the controller consisted of the five most recent state observations. Each state variable was discretized into 10 bins. The width of the bins was determined by running many simulations with randomly generated control signals and observing the minimum and maximum values achieved for each variable. The two control/action output variables were discretized into 10 bins. Since there is one register per output variable bin, there was a total of 20 registers. Each register consisted of 5 rules/rows and each rule had a maximum of 32 entries (connections to input variables).

In these experiments $c=1.1$, $p_{max}=0.8$, $n_{pop}=10$, $n_{gen}=10$, and $n_{win}=1$ was used. The fitness of each sampled controller was computed by taking the median reward across five simulation runs starting from different initial conditions. The evolutionary search process was terminated once all $n_{gen}=10$ probability distributions had converged. The controllers optimized using the invention were compared to state-of-the-art (SOA) controllers from the literature implemented as deep neural networks. The deep neural networks have continuous-valued activations and weighted connections. The dimensionality of the search space was 32000. It was found that the controllers described herein solved the problem (i.e., achieved a median reward of at least 200), achieved median rewards at the same level of SOA deep neural network controllers (i.e., median rewards between 250 and 300), but, significantly, the controllers of the present invention required 5×-10× fewer connections, used only binary activations, and do not require weighted connections. This makes the controllers described herein better suited for implementation in low-SWaP hardware than deep neural networks and demonstrates the effectiveness of the present invention in high-dimensional search spaces.

The invention can be used to identify and optimize low-SWaP controllers. Such controllers are of value in a range of commercial and defense applications, including control of small vehicles, such as micro-air vehicles (MAVs), and low-power sensors for use on autonomous platforms with small form factors, such as object detection from low-resolution images. A practical application of the present invention is the automated discovery (via a unique evolutionary process) of connections within a controller for processing sensor data and producing control outputs to control the behavior of micro-air vehicles. A practical benefit of the invention is that it allows evolving/optimizing high-performing controllers with millions of connections using only the computational resources available on a consumer off-the-shelf laptop computer. The evolved controllers have far fewer connections than SOA deep neural networks, the connections do not require weights, and the processing only requires binary activations, which leads to substantially reduced size, weight, and power requirements for hardware implementations.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for optimizing controllers for a micro-air vehicle, each controller having an electronic circuit of connections configured to receive sensor inputs as a temporal sequence of sparse binary vectors, the system comprising:
   one or more processors and a non-transitory computer-readable medium having executable instructions encoded thereon such that when executed, the one or more processors perform operations of:
   identifying a set of binary rules that leads to a desired behavior of the micro-air vehicle, wherein identifying the set of binary rules comprises:
      (a) sampling a plurality of rule-sets from a probability distribution over a search space;
      (b) determining a fitness value of each rule-set for the desired behavior;
      (c) selecting a set of top-performing rule-sets having fitness values at or above a predetermined percentile;
      (d) updating the probability distribution over the search space with the set of top-performing rule-sets;
   repeating (a) through (d) until a convergence criterion is met, resulting in a fittest rule-set; and
   transmitting a control signal based on the identified set of binary rules to one or more actuators of the micro-air vehicle to cause the one or more actuators to physically actuate and cause the micro-air vehicle to perform the desired behavior.

2. The system as set forth in claim 1, wherein the desired behavior is at least one of landing safely on ground and avoiding obstacles during flight.

3. The system as set forth in claim 1, wherein the one or more processors perform operations of:
   storing a binary-value from each sensor input in a cell of a register having a plurality of rows;
   summing the binary-values within each row of each register,
   wherein for each register, a maximum value among the sums of its rows becomes the register's output;
   identifying a largest of the maximum values; and
   determining the control signal using the largest of the maximum values.

4. The system as set forth in claim 1, wherein the rule-sets are sparse binary vectors that act as templates for patterns in the sensor inputs, and
   wherein the one or more processors are configured for determining a quality of a match between the sensor inputs and a rule-set by performing an element-wise exclusive-or operation between the sensor inputs and the rule-set and summing the result.

5. The system as set forth in claim 1, wherein for each rule in a rule-set, a list of positive numbers with a length corresponding to a number of sensor inputs is defined, resulting in a set of lists, and wherein the set of lists is used to define a probabilistic generative model with the probability distribution.

6. A computer program product for optimizing controllers for a micro-air vehicle, each controller having an electronic circuit of connections configured to receive sensor inputs as a temporal sequence of sparse binary vectors, the computer program product comprising:
   a non-transitory computer-readable medium having executable instructions encoded thereon, such that upon execution of the instructions by one or more processors, the one or more processors perform operations of:
   identifying a set of binary rules that leads to a desired behavior of a micro-air vehicle, wherein identifying the set of binary rules comprises:
      (a) sampling a plurality of rule-sets from a probability distribution over a search space;
      (b) determining a fitness value of each rule-set for the desired behavior;
      (c) selecting a set of top-performing rule-sets having fitness values at or above a predetermined percentile;
      (d) updating the probability distribution over the search space with the set of top-performing rule-sets;
   repeating (a) through (d) until a convergence criterion is met, resulting in a fittest rule-set; and
   transmitting a control signal based on the identified set of binary rules to one or more actuators of the micro-air vehicle to cause the one or more actuators to physically actuate and cause the micro-air vehicle to perform the desired behavior.

7. The computer program product as set forth in claim 6, wherein the desired behavior is at least one of landing safely on ground and avoiding obstacles during flight.

8. The computer program product as set forth in claim 6, wherein the one or more processors perform operations of:
   storing a binary-value from each sensor input in a cell of a register having a plurality of rows;
   summing the binary-values within each row of each register,
   wherein for each register, a maximum value among the sums of its rows becomes the register's output;
   identifying a largest of the maximum values; and
   determining the control signal using the largest of the maximum values.

9. The computer program product as set forth in claim 6, wherein the rule-sets are sparse binary vectors that act as templates for patterns in the input, and
   wherein the one or more processors are configured for determining a quality of a match between the sensor inputs and a rule-set by performing an element-wise exclusive-or operation between the sensor inputs and the rule-set and summing the result.

10. The computer program product as set forth in claim 6, wherein for each rule in a rule-set, a list of positive numbers with a length corresponding to a number of sensor inputs is defined, resulting in a set of lists, and wherein the set of lists is used to define a probabilistic generative model with the probability distribution.

11. A computer implemented method for optimizing controllers for a micro-air vehicle, each controller having an electronic circuit of connections configured to receive sensor inputs as a temporal sequence of sparse binary vectors, the method comprising an act of:
   causing one or more processors to execute instructions encoded on a non-transitory computer-readable medium, such that upon execution, the one or more processors perform operations of:
   identifying a set of binary rules that leads to a desired behavior of a micro-air vehicle, wherein identifying the set of binary rules comprises:

(a) sampling a plurality of rule-sets from a probability distribution over a search space;
(b) determining a fitness value of each rule-set for the desired behavior;
(c) selecting a set of top-performing rule-sets having fitness values at or above a predetermined percentile;
(d) updating the probability distribution over the search space with the set of top-performing rule-sets;
repeating (a) through (d) until a convergence criterion is met, resulting in a fittest rule-set; and
transmitting a control signal based on the identified set of binary rules to one or more actuators of the micro-air vehicle to cause the one or more actuators to physically actuate and cause the micro-air vehicle to perform the desired behavior.

12. The method as set forth in claim 11, wherein the desired behavior is at least one of landing safely on ground and avoiding obstacles during flight.

13. The method as set forth in claim 11, wherein the one or more processors perform operations of:
storing a binary-value from each sensor input in a cell of a register having a plurality of rows;
summing the binary-values within each row of each register,
wherein for each register, a maximum value among the sums of its rows becomes the register's output;
identifying a largest of the maximum values; and
determining the control signal using the largest of the maximum values.

14. The method as set forth in claim 11, wherein the rule-sets are sparse binary vectors that act as templates for patterns in the input, and
wherein the one or more processors are configured for determining a quality of a match between the sensor inputs and a rule-set by performing an element-wise exclusive-or operation between the sensor inputs and the rule-set and summing the result.

15. The method as set forth in claim 11, wherein for each rule in a rule-set, a list of positive numbers with a length corresponding to a number of sensor inputs is defined, resulting in a set of lists, and wherein the set of lists is used to define a probabilistic generative model with the probability distribution.

16. The method as set forth in claim 11, wherein updating the probability distribution over the search space comprises updating the plurality of rule-sets sampled based on the fittest rule-set.

17. The method as set forth in claim 16, further comprising:
combining multiple updated rule-sets; and
identifying a fittest rule-set from the combination of updated rule-sets.

* * * * *